(12) United States Patent
Birger et al.

(10) Patent No.: US 9,471,183 B1
(45) Date of Patent: Oct. 18, 2016

(54) MOBILE DEVICE INCORPORATING PROJECTOR AND PEN-LOCATION TRANSCRIPTION SYSTEM

(71) Applicant: PNF CO., LTD., Belmont, CA (US)

(72) Inventors: Ari Birger, Palo Alto, CA (US); Philip A. Weaver, Santa Clara, CA (US)

(73) Assignee: PNF CO., LTD., Belmont, CA (US)

( * ) Notice: Subject to any disclaimer, the term of this patent is extended or adjusted under 35 U.S.C. 154(b) by 508 days.

(21) Appl. No.: 13/939,143

(22) Filed: Jul. 10, 2013

Related U.S. Application Data

(63) Continuation of application No. 10/935,570, filed on Sep. 7, 2004, now Pat. No. 8,487,915.

(51) Int. Cl.
*G09G 5/00* (2006.01)
*G06F 3/043* (2006.01)

(52) U.S. Cl.
CPC .................................. *G06F 3/0433* (2013.01)

(58) Field of Classification Search
CPC . G06F 3/0433; G06F 3/0426; G06F 3/04883
USPC .................................. 345/175, 179, 156, 169
See application file for complete search history.

(56) References Cited

U.S. PATENT DOCUMENTS

| | | | |
|---|---|---|---|
| 4,873,398 A * | 10/1989 | Hubby, Jr. | G06F 3/0418 178/18.07 |
| 5,581,243 A | 12/1996 | Ouellette et al. | |
| 5,717,168 A | 2/1998 | DeBuisser et al. | |
| 5,818,451 A | 10/1998 | Bertram et al. | |
| 6,191,778 B1 | 2/2001 | Chery et al. | |
| 6,305,805 B1 | 10/2001 | Liebenow | |
| 6,614,422 B1 | 9/2003 | Rafii et al. | |
| 6,618,076 B1 | 9/2003 | Sukthankar et al. | |
| 6,661,563 B2 | 12/2003 | Hayashi et al. | |
| 6,741,267 B1 | 5/2004 | Leperen | |
| 6,756,972 B2 | 6/2004 | Komatsu et al. | |

(Continued)

FOREIGN PATENT DOCUMENTS

WO     WO 03/001497 A1     1/2003

OTHER PUBLICATIONS

"New E-paper could show moving images too." Reuters, Sep. 24, 2003. Downloaded from http://www.forbes.com/home_europe/newswire/2003/09/24/rtr1090431.html on Feb. 3, 2004. Online at http://forbes.com/.

(Continued)

*Primary Examiner* — Alexander Eisen
*Assistant Examiner* — Leonid Shapiro
(74) *Attorney, Agent, or Firm* — Kile Park Reed & Houtteman PLLC

(57) ABSTRACT

A mobile device providing a mobile processing function such as a mobile telephone and/or a personal digital assistant. The mobile device includes a mobile device body, a processing system within the body providing at least part of the mobile processing function, a projector coupled to the body to project an image onto a substantially planar surface when the mobile device body is on the surface such that the projector projects at a predetermined angle relative to the surface, and a pen-location transcription system coupled to the processing system to record the positions of a writing implement or stylus at a plurality of instants of time by transmitting acoustic energy between the writing implement or stylus and a device mechanically coupled to the mobile device body.

6 Claims, 12 Drawing Sheets

(56) References Cited

U.S. PATENT DOCUMENTS

| | | | |
|---|---|---|---|
| 6,999,061 B2* | 2/2006 | Hara | G06F 3/04883 |
| | | | 178/18.01 |
| 7,242,388 B2* | 7/2007 | Lieberman | G06F 3/0426 |
| | | | 345/156 |
| 8,487,915 B1 | 7/2013 | Birger et al. | |
| 2003/0001825 A1 | 1/2003 | Omura et al. | |
| 2003/0071798 A1 | 4/2003 | Baron et al. | |
| 2003/0147260 A1* | 8/2003 | Moss | B43K 23/004 |
| | | | 362/579 |
| 2003/0151596 A1 | 8/2003 | Moyne et al. | |
| 2004/0184011 A1* | 9/2004 | Raskar | G03B 21/26 |
| | | | 353/94 |
| 2004/0246236 A1 | 12/2004 | Hildebrandt et al. | |
| 2005/0169527 A1* | 8/2005 | Longe | G06F 3/0237 |
| | | | 382/177 |

OTHER PUBLICATIONS

Product Information: "InkLink Handwriting System." Seiko Instruments USA Inc., Torrance, California. Available online at http://www.siibusinessproducts.com/products/link-ir-p.html.

"Display Specs for Rollable Display." Polymer Vision, Eindhoven, Holland. Available Online at http://polymervision.nl/.

"Philips Creates Foldable Screens for E-Newspapers." Reuters, Jan. 26, 2004. Downloaded from Yahoo!News on Feb. 2, 2004. Online at http://news.yahoo.com/.

G. Fink, M. Wienecke and G. Sagerer. "Video-Based On-line Handwriting Recognition." Proc. International Conference on Document Analysis and Recognition, pp. 226-230. *IEEE*, 2001.

R. Sukthankar, R. Stockton and M. Mullin. "Automatic Keystone Correction for Camera-assisted Presentation Interfaces." Appears in: *Advances in Multimodal Interfaces. Proceedings of ICMI*, 2000.

M. Munich and P. Perona. "Visual Input for Pen-Based Computers." Proceedings of the 13th International Conference on Pattern Recognition, Vienna, Aug. 1996.

X. Tang and F. Lin. "Video-Based Handwritten Character Recognition." Proc. International Conference on Acoustics, Speech, and Signal Processing, IEEE, 2002.

A. Vardy, J. Robinson and L. T. Cheng. "The WristCam as Input Device." Proceedings of the Third International Symposium on Wearable Computers, San Francisco, California, Oct. 1999, pp. 199-202.

O. Özün, Ö. F. Özer, C. Ö. Tützel, V. Atalay and A. E. Çetin. "Vision Based Single Stroke Character Recognition for Wearable Computing." Appears in: *IEEE Intelligent Systems and Applications*, Jun. 2001.

M. Wienecke, G. Fink and G. Sagerer. "A Handwriting Recognition System Based on Visual Input." In 2nd International Workshop on Computer Vision Systems, pp. 63-72, Vancouver, Canada, 2001. *IEEE*.

"E-Pen: How It Works." Downloaded from www.e-pen.com on Sep. 11, 2003. E-Pen™ system available from InMotion E-Pen Ltd, Matam, Haifa, Israel.

"E-Pen: Introducing." Downloaded from www.e-pen.com on Sep. 11, 2003. E-Pen™ system available from InMotion E-Pen Ltd, Matam, Haifa, Israel.

Product Information: "Preliminary Concept: Laser Projection Display (LPD)." Symbol Technologies, Inc., Oakland, CA, 2004. Available online at: http://www.symbol.com/products/oem/lpd.html.

Product Information: "eBeam Cable for Palm Handhelds." Electronics for Imaging, Foster City, CA. Online at www.efi.com.

Product Information: "PC Notes Taker." Downloaded from http://www.pegatech.com/Articles/Article.asp?ArticleID=41&CategoryID=31 on Oct. 7, 2003. Pegasus Technologies Ltd., Tel Aviv, Israel. Online at www.pegatech.com.

Product Information: "eBeam Cable for Palm Handhelds", Electronics for Imaging, Foster City, CA; Retrieved at www.efi.com on Sep. 4, 2003.

"A Flexible Display for Dedicated Use", Polymer Vision, Eindhoven, Holland; Retrieved at http://polymervision.nl/ on Dec. 29, 2004.

Product Information: "InkLink Handwriting System", Seiko Instruments USA Inc., Torrance, California; Retrieved at http://www.siibusinessproducts.com/products/link-ir-p.html on Oct. 7, 2003.

\* cited by examiner

Side view AA

Side view

Side view AA

Top view BB

MOBILE DEVICE INCORPORATING PROJECTOR AND PEN-LOCATION TRANSCRIPTION SYSTEM

The present invention is a continuation of, and claims benefit of priority of U.S. application Ser. No. 10/935,570 filed Sep. 7, 2004 to inventors Birger, et al., now U.S. Pat. No. 8,487,915. U.S. application Ser. No. 10/935,570 is a conversion of, and claims benefit of priority of U.S. Provisional Patent Application No. 60/502,504 to inventors Birger, et al., filed Sep. 11, 2003. The contents of each of U.S. application Ser. Nos. 10/935,570 and 60/502,504 are incorporated herein by reference.

BACKGROUND

There are available today a wide variety of mobile devices, including mobile telephones, e.g., cellular telephones, personal digital assistants (PDAs), GPS devices, and so forth. Such mobile devices typically have a small form factor in order to make them more portable and/or more attractive.

Mobile devices, however, are typically restricted as to the type and number of input/output devices that may be attached. Microphones and video cameras, for example, are becoming common. Connecting to other input/outputs sources is rather restricted.

There often is a need in the art to transcribe pen strokes, for example those that occur during writing. Transcription systems are known for recording such pen strokes. Luidia, Inc., the assignee of the present invention, makes a system called eBeam that provides for recording pen strokes on a surface such as a whiteboard. Such a system is interfaced, e.g., using a USB connection, to a computer and captures the pen strokes on the computer, including the color of the pen and any erasing. See for example, TechTV's online review of the eBeam system available (September 2003) at http://www.techtv.com/ as the URL www~dot~techtv~dot~com/products/hardware/story/0,23008,3376062,00~dot~html and also as the URL http://www~dot~techtv~dot~com/products/print/0,23102,3376062,00~dot~html, where ~dot~ denotes the period character "." in the actual URL. Such a system is useful for capturing pen strokes on a whiteboard, or even on a flip chart. While typically, a computer is used, the device may be interfaced to a PDA. A similar recording device also is known that is battery operated and that records pen strokes without a computer. The stored pen strokes do, at some stage, need to be loaded to a computer. See, for example, the Mimio XI® device made by Virtual Ink Corporation of Boston, Mass.

So while devices that capture pen strokes are known, there is however, a need for a device that can capture pen strokes on a small scale, for example, when writing on a letter-size sheet of paper. While digitizing pads are known that provide for such pen stroke capturing, such digitizing pads are relatively bulky and non-portable. Furthermore, such digitizing pads need to be interfaced to a computer, or are incorporated in a computer.

Thus there is a need for a device that can capture pen strokes, e.g., on a sheet of paper, and that is portable.

It is known to project a computer-generated image on a flat surface. It also is known to project such a computer generated image on to a surface such as a white board, and to then capture pen strokes drawn on the projected image, e.g., as an overlay. The above-mentioned eBeam system can transform any flat surface into an area wherein pen strokes are capturable. One or more computer generated images may be projected on such a surface, e.g., using a common LCD projector attached to the video output port of a computer, e.g., a laptop computer. Using the eBeam system, pen strokes drawn over the projected image may be captured for later playback and analysis, including synchronized playback with the projected image or images. Such an arrangement is however bulky, and suitable for when there is a large enough audience.

It also is known to use a computer display such as a LCD display that has a touch sensitive surface, or onto which is retrofitted a pen stroke capture system such as an eBeam system. Such a device, however, requires a laptop computer or a tablet computer, and further requires drawing on a screen or similar surface.

There thus is a need for a portable system that can project an image onto a relatively small area and that incorporates a pen-location system for capturing pen strokes.

SUMMARY

Described herein is a mobile device providing a mobile processing function such as a mobile telephone and/or a personal digital assistant function. The mobile device includes a mobile device body, a processing system within the body programmed to provide part of the mobile processing function, a projector coupled to the processor and mechanically coupled to the body to project an image onto a substantially planar surface when the mobile device body is on the surface at a predetermined angle relative to the surface, and a pen-location transcription system coupled to the processing system to record the positions of a writing implement at a plurality of instants of time by transmitting energy between the writing implement and a device mechanically coupled to the mobile device body. In one version, the device mechanically coupled to the mobile device body is a sensor array including at least two sensors of the transmitted energy. The writing implement includes a transmitter of the transmitted energy. In another embodiment, the device mechanically coupled to the mobile device body includes one or more transmitters transmitting the energy, and the writing implement includes at one or more sensors of the transmitted energy.

The projector coupled to the processing system generates an image from the processing system, e.g., an image generated by the processing system or stored in a memory of the processing system.

DETAILED DESCRIPTION

Described herein is one embodiment of a mobile device that provides a mobile device functionality such as a mobile telephone or a PDA functionality, and that also includes a projector for projecting an image onto a surface, and a pen-location transcription system that includes sensor system for capturing and storing on the mobile device pen strokes made by a transmitting writing implement in the vicinity of the projected image on the surface.

The inventors recognize that mobile devices such as mobile telephones and PDAs include a processing system that is powerful enough to process and has sufficient memory to store pen strokes.

Recently, small projectors of computer-generated images have been made available that are of a size suitable for incorporation in a mobile device such as a mobile telephone or PDA. One such device is the Laser Projection Display (LPD) made by Symbol Technologies, Inc. of Holtsville, N.Y. Preliminary specifications are available (September 2003) at the URL www~dot~symbol~dot~com/products/oem/lpd~dot~html, where ~dot~ denotes the period character "." in the actual URL. The LPD scans a laser beam along two directions, typically orthogonal, to generate a high quality image on any surface, at any distance, without refocusing.

One aspect of the invention is embedding a projector such as a miniature, low power LPD module in a portable device, such as a mobile telephone or a PDA. Another aspect of the invention is embedding the sensors of a pen capture system in a portable device such as a PDA or telephone, such sensors sensing energy transmitted by one or more transmitters in a writing implement.

Figure 1A:
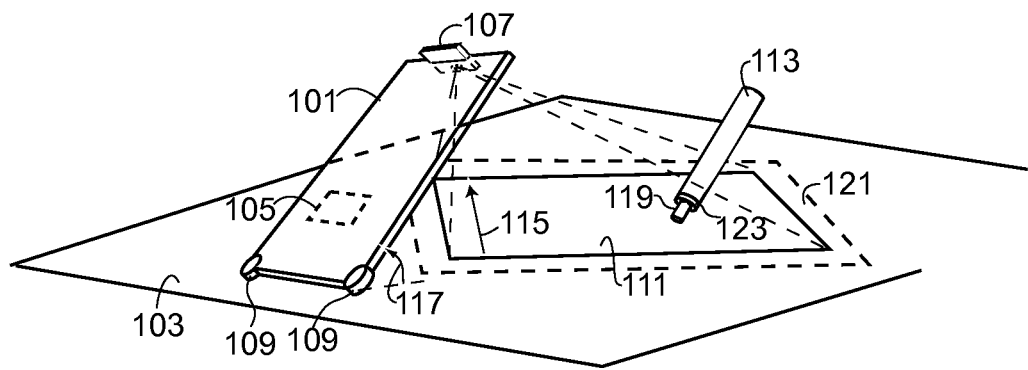
FIG. 1A shows in simplified form one embodiment of a mobile device that includes a projector and a pen-location transcription system, with the projector projecting an image at a first orientation relative to the orientation of the body of the mobile device.

FIG. 1A shows in simplified form one embodiment of a mobile device that includes a projector and a pen-location transcription system, with the projector projecting an image at a first orientation relative to the orientation of the mobile device. The mobile device includes a body 101 and a processing system 105 that provides a mobile processing function. A first embodiment provides mobile telephony function, e.g., can act as a mobile telephone client for a cellular wireless telephone system and includes a processor of a processing system programmed to be part of providing the mobile telephony functionality. A second embodiment provides PDA functionality, including an address book, a calendar, and/or other common PDA functions, and includes a processor of a processing system programmed to be part of providing the PDA function. Other embodiments have other mobile devices that provide different functions. One embodiment, for example, is a mobile device that provides PDA functionality and mobile telephone functionality.

One embodiment of the mobile device includes a projector 107 coupled to the body 101 to project an image 111 into a substantially planar surface 103 when the mobile device body 101 is on the surface 103 at a predetermined angle 117 relative to the surface 103. The projector and the angle are such that when the mobile device is at the predetermined angle, the projected image is in focus and substantially rectangular.

The mobile device further includes a pen-location transcription system that in one embodiment includes a sensor array coupled to the body. The sensor array includes at least two sensors 109 mechanically coupled to the mobile device body 101 and a mechanism establishing a relationship between the said at least two sensors, such that when the mobile device body 101 is on the surface 103 at a predetermined angle 117, the sensors 109 are close to the surface and form an active area 121 on the planar surface 103 that includes the projected image 111 such that the sensor array 109 provides a tracking function for the pen-location transcription system to determine the position in the active area of a writing implement that includes a transmitter. The tracking function in turn forms a pen-location transcription system. One such writing implement 113 is shown in FIG. 1A. The writing implement includes one or more transmitters 119 that transmit energy that is detectable by the sensor array 109 when the writing implement 113 is in the active area 121.

The projector is coupled to the processing system 105 of the mobile device such that the projected image is an image from the processing system and projected onto the surface by the projector. The projected image 111 is substantially rectangular.

In one embodiment, the projector coupled to the processing system is a laser projection display (LPD) such as the LPD made by Symbol Technologies, Inc. of Holtsville, N.Y. The LPD includes a laser, generates a laser beam and scans the laser beam along two substantially orthogonal directions to form the projected image 111 on the surface 103. Using a laser beam avoids the problem of focussing.

When a laser beam scans a substantially rectangular image, two directions may be defined: the fast scan direction and the slow scan direction. The laser beam forms scan lines in the fine scan direction.

In one embodiment, the projector is arranged in the mobile device such that the substantially rectangular projected image 111 has parallel sides that are at an angle, e.g., approximately 45 degrees, to the mobile device so that the mobile device is close to a corner of the substantially rectangular projected image when the surface 103 is viewed from the top. This is the arrangement shown in FIG. 1A. When the image is formed by scan lines generated by a laser, the fast scan direction in FIG. 1A is indicated by arrow 115.

In one embodiment shown in FIG. 1A, the sensors of the sensor array are at the corners of the body of the mobile device closest to the surface 103.

Figure 1B:
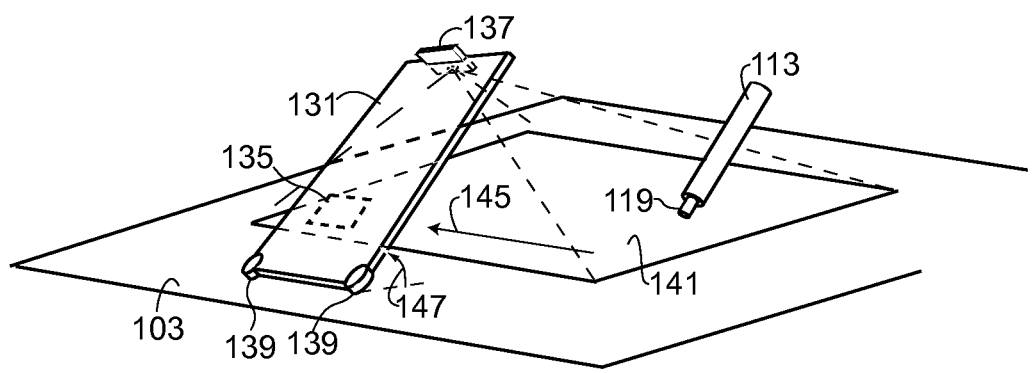
FIG. 1B shows in simplified form another embodiment of a mobile device that includes a projector and a pen-location transcription system, with the projector projecting an image at a different orientation than the first orientation relative to the orientation of the body of the mobile device.

FIG. 1B shows an alternate embodiment in simplified form. Different reference numerals are used for some of the elements, but those in the art will understand that the same elements as shown in FIG. 1A, possible arranged differently, may be used. FIG. 1B shows a mobile device that includes a body 131 and a processing system 135 that provides a mobile processing function. The mobile device also includes a projector 137 coupled to the processing system and mechanically coupled to the body to project an image 141 into the substantially planar surface 103 when the mobile device body 131 is on the surface 103 at a predetermined angle 147 relative to the surface 103. The projector and the angle are such that when the mobile device is at the predetermined angle, the projected image is in focus and substantially rectangular. The mobile device further comprises a sensor array 139 coupled to the body that includes at least two sensors mechanically coupled to the mobile device body 131 such that when the mobile device body 131 is on the surface 103 at a predetermined angle 147, the sensors 139 are close to the surface and form an active area on the planar surface 103 that includes the projected image 141 such that the sensor array 139 provides a tracking function to determine the position of a writing implement, e.g., writing implement 113 in the active area that includes one or more transmitters. In the embodiment shown in FIG. 1B, the projector is arranged in the mobile device such that the substantially rectangular projected image has parallel sides that are substantially parallel to the mobile device body 131 so that the mobile device body 131 is closest to a side of the substantially rectangular projected image 141 when the surface 103 is viewed from the top. When the image is formed by scan lines generated by a laser, the fast scan direction in FIG. 1B is indicated by arrow 145.

In one embodiment, the projector is a laser projection display coupled to the processing system 135 of the mobile device such that the projected image is an image from the processing system and projected onto the surface by the projector. The projected image 141 is substantially rectangular, with one side of the projected image One aspect of the invention is that the projected image is proper when the mobile device is on the surface at the predetermined angle relative to the surface. For example, that ensures that the image is in focus and that the image has the desired, e.g., rectangular-shaped boundary, and that the sensors and associated location calculating mechanism are calibrated correctly to determine the position of a writing implement in the active area.

Figure 2A:
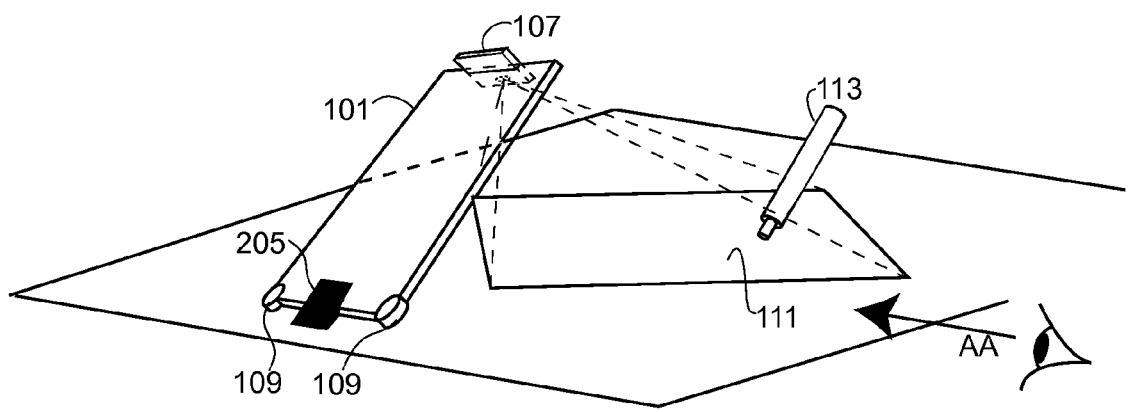
FIG. 2A shows the mobile device of FIG. 1A with a support clip that ensures that the mobile device body is maintained at a predetermined angle relative to the surface.
Figure 2B:
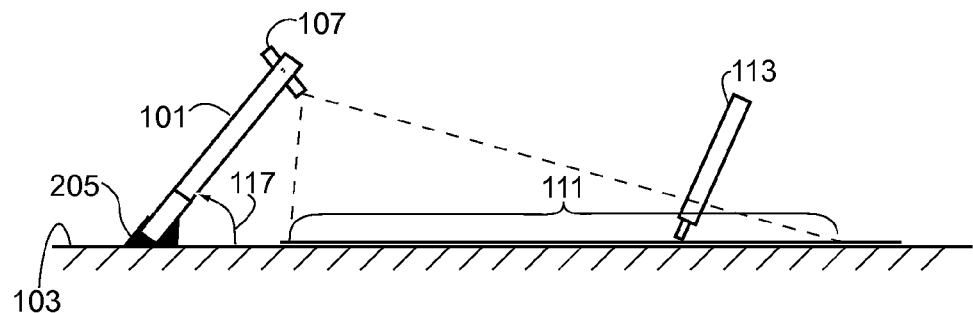
FIG. 2B shows a side view of the device shown in FIG. 2A with the support clip being a separable support clip into which the mobile device body slips so that the predetermined angle is maintained and the mobile device is supported at the predetermined angle.

FIGS. 2A and 2B show one embodiment that includes a support mechanism that ensures that the mobile device is at the predetermined angle. The arrangement and projected image orientation of FIG. 1A is assumed, and FIG. 2A repeats such an arrangement. A support clip 205 ensures the correct angle 117. FIG. 2B shows a side view (indicated as view AA in FIG. 2A) that more clearly shows the mobile device maintained at the predetermined angle. In one embodiment, the support clip is a separable support clip into which the mobile device body 101 slips so that the predetermined angle is maintained and the mobile device is supported at the predetermined angle 117. In another embodiment shown in side view in FIG. 2C, the support clip, now shown as clip 215 is attached to the body of the mobile device 101 using a hinge 213, i.e., is hingeably attached, and folds at the hinge to provide the support to maintain the mobile device body 101 at the predetermined angle to the surface 103. The hinge and support clip combination clicks into place to lock at the correct angle.

Figure 3A:
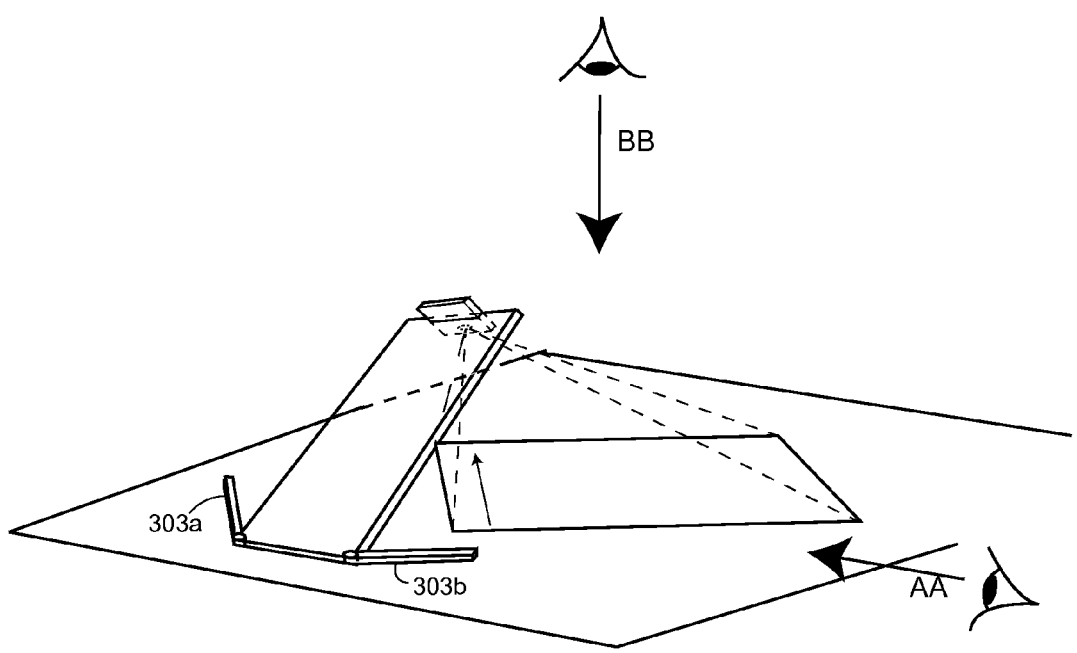
FIGS. 3A, 3B and 3C show different views of a mobile device embodiment wherein the sensors are in a pair of arms that also form a support mechanism.
Figure 3B:
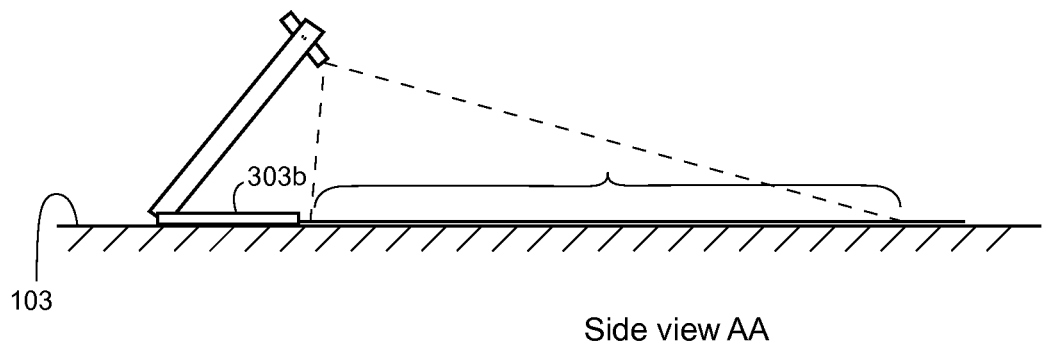
Figure 3C:
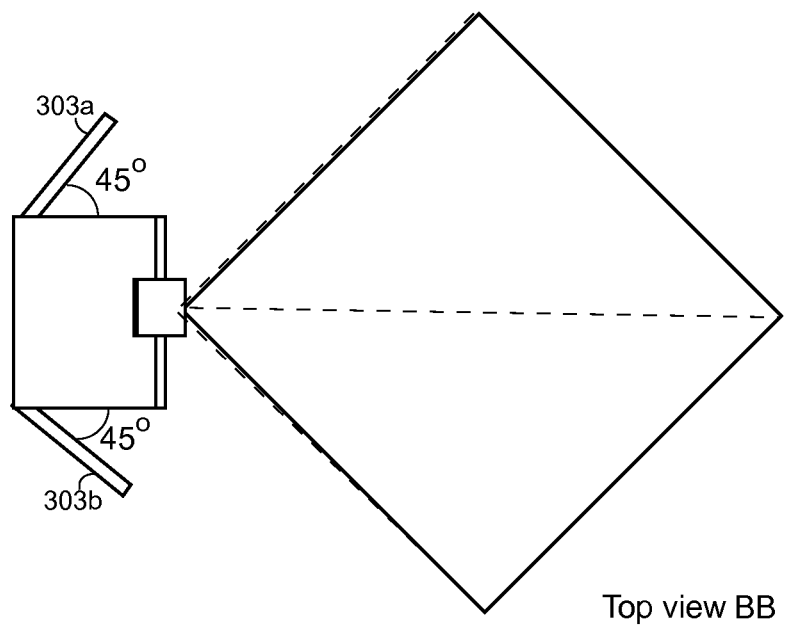

FIGS. 3A, 3B and 3C show yet another embodiment wherein the mechanism that provides the relationship between the at least two sensors and the support mechanism are combined. FIG. 3A shows a perspective view assuming the first projection orientation of FIG. 1A, and FIGS. 3B and 3C show a side and top view, respectively, shown in FIG. 3A as views AA and BB, respectively. In this embodiment, the sensors are in a pair of arms 303a and 303b that form a support mechanism. The arms are each hingeably connected to the mobile device body and able to be folded in and out. When folded in, the arms are flush with the body. When folded out, the arms lock to maintain the mobile device body at the predetermined angle to the surface. In this arrangement, the support mechanism includes the mechanism establishing the relationship between said at least two sensors such that when the arms lock to maintain the mobile device body at the predetermined angle to the surface, the relationship between said at least two sensors is established.

In one embodiment, when the arms 303a, 303b click in place folded out, the arms are at 90 degrees to each other and 45 degrees to the body of the mobile device as shown in FIG. 3C. This offers more sensor separation than if the sensors were fixed at the corners of the mobile device body, as, for example, is the case in FIG. 1A.

Those in the art will recognize that many other arrangements are possible to provide support to maintain the mobile device at the predetermined angle to the surface. The inventors recognize this, and rather than enumerate every possible arrangement, such arrangements are meant to be covered here by the phrase "a support mechanism to maintain the mobile device body at the predetermined angle to the surface."

Figure 2C:
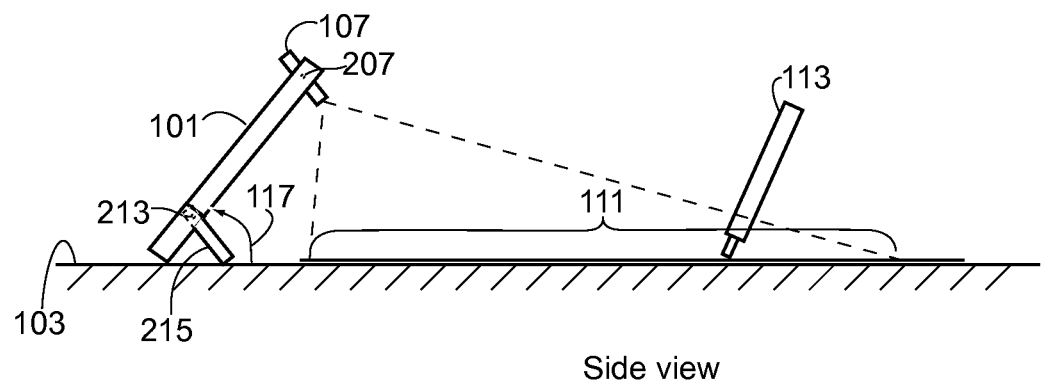
FIG. 2C shows an alternate arrangement wherein the support clip is attached to the body of the mobile device using a hinge.

FIGS. 2A, 2B and 2C show the case of the projector 107 being in a casing that is hingeably attached to the body of the mobile device. The hinge is shown, e.g., in FIG. 2C as hinge 207. For projecting the image, the projector casing folds out and locks into place to correctly project when the mobile device body is at the predetermined angle to the surface. When the projector is not projecting, the projector casing may be folded in and can lock in place to be flush with the surface of the mobile device body.

Other embodiments of mechanically coupling the projector also are possible, including one in which the projector is in the mobile device body.

The combination of the mobile device and the sensor array forms a pen-location transcription system designed to record stroke data, for example corresponding to writing within the active area. In different versions, the pen-location transcription system may further record writing color, writing pressure, writing angling, erasing, user identification, and may associate time, video and audio data in combination with the stroke data. Stroke data may be generated from writing that involves the delivery of media to a writing surface (e.g., ink, erasable ink, pencil, crayon, chalk, etc.) or may involve the electronic creation of writing.

Figure 6:
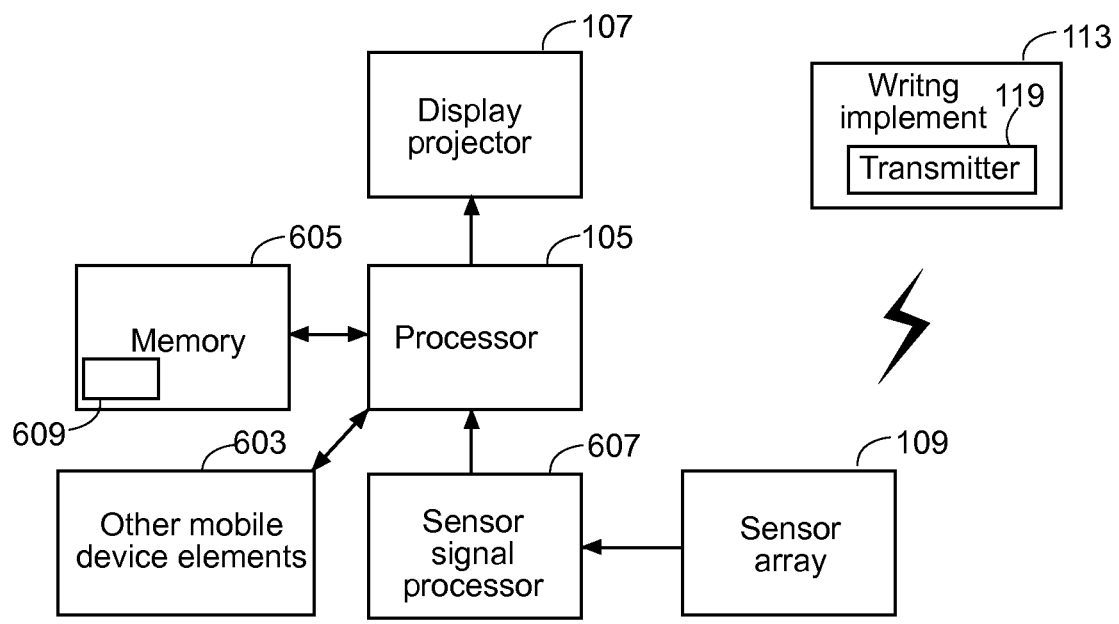
FIG. 6 shows a simplified block diagram of an embodiment of a mobile device that includes the sensor array and the projector.

FIG. 6 shows a block diagram of the pen-location transcription system in combination with the mobile device. The sensor array 109 includes at least a pair of sensors that pick up signals transmitted from one or more transmitters 119 in a writing implement. Note the term writing implement as used herein is a device that generates the recordable position(s), i.e., the pen stroke(s). Thus the writing implement may be a device that erases rather than generates marks.

One or more processors are included in processing system 105 that includes a memory 605 coupled to the processor(s). In one embodiment, a display projector device 107 is coupled to the processing system 105 and is able to display an image generated by the processing system onto the surface 103 or stored in the memory 605.

The sensor array is coupled to a sensor signal processor 607 coupled to the processing system 105. The sensor signal processor 607 alone, or in combination with the processing system 105, processes the signals detected by the sensor array to determine the position of the writing implement 113 relative to active area, and in particular, relative to the projected image at multiple points in time. In one embodiment, the sensor signal processor 607 includes an analog to digital converter (ADC) and a digital signal processor DSP device. In another embodiment, one or more ADCs are incorporated in the sensor array. In yet another embodiment, the digital processor part of sensor signal processor 607 is included in the processing system 105.

The processing of signals received at the sensor array and processed by the sensor signal processor or both the sensor signal processor 607 and processing system 105 is carried out by a set of instructions that instruct the sensor signal processor 607 and/or processing system 105 to carry out the required steps. Such instructions form computer readable code segments. In one embodiment, the code segments are stored in memory 105 and shown as code segments 609 in FIG. 6.

The mobile device includes one or more other elements coupled to the processing system, collectively shown as other mobile device elements 603, related to providing the function of the mobile device. For example, a mobile telephone will include a microphone, a speaker, a display device, analog to digital and digital to analog conversion devices, a keypad, a radio transceiver, a modulator/demodulator, and processing functionality. The processing functionality may be partially or completely provided by processing system 105. Similarly, a PDA will include a device, a mechanism to input data, e.g., a stylus and touch sensitive surface on the display, and so forth.

Note that FIG. 6 is shown in highly simplified form in order not to obscure the inventive aspects with unnecessary detail. For example, the memory is shown directly connected to the processor in processing system 105. Those in the art will understand in an actual implementation, the memory will be coupled to the processor via a bus system that may include one or more buses. Other devices also will be coupled via the bus system. The memory itself is shown as one block, but in an actual implementation, may include many components, including static RAM, RAM, ROM, removable storage, and so forth. Furthermore, the code segments 609 are shown in the memory 605. In an actual implementation, when the invention operates, only some of the instructions will be in only some of the memory at any one time. Furthermore, the term memory is used herein broadly and includes any non-transitory computer-readable medium that has stored therein the computer readable code segments.

One aspect of the invention includes correcting for the distortion caused by the distances from the projector to the four corners of the projected image being non-equal. It is known that if a projector is aimed so that the center beam line—the line from the projector to the center point of the projected image—is perpendicular to the plane on which the image is projected, the image will appear without distortion, e.g., rectangular. Such a placement however is difficult to achieve with the present invention wherein projector is included in the mobile device. Without correction, not having the projector aimed such that the center beam line is perpendicular to the surface 103 will result in a distorted image that in general is not rectangular.

Figure 4A:
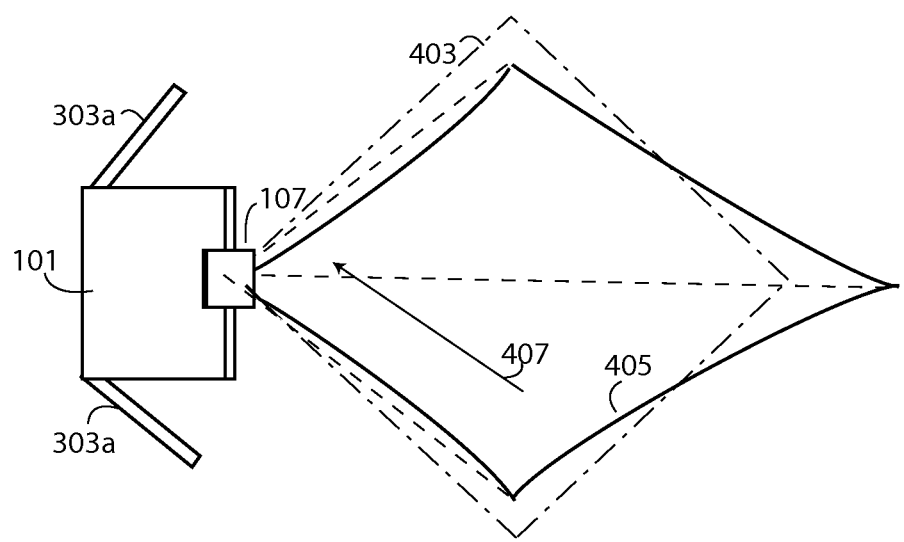
FIGS. 4A and 4B show how without correction, the images formed are distorted in the respective cases of the projected image being at the first orientation (as in FIG. 1A) and the other orientation (FIG. 1B), respectively.

FIG. 4A shows a top view of the system of FIG. 3A with the projector arranged in the mobile device such that the substantially rectangular projected image (suppose no correction is required) has parallel sides that are at an angle, e.g., approximately 45 degrees, to the mobile device so that the mobile device is close to a corner of the substantially rectangular projected image when the surface 103 is viewed from the top. FIG. 4A shows as dotted line 403 the desired boundary of the projected image, i.e., without distortion. As a result of the distortion, the projected image 405, however, is not rectangular, as shown. Line 407 indicates the fast scan direction for a laser scan. Note that the distorted image 405 is shown with the distortion exaggerated, and may not show the distortion accurately.

Figure 4B:
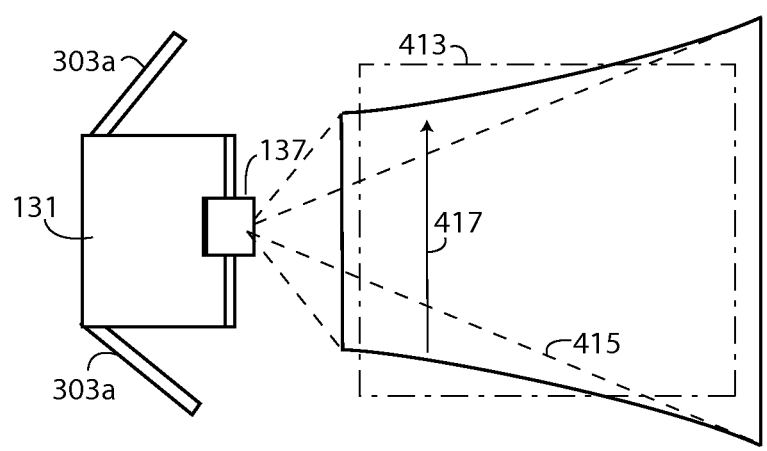

FIG. 4B shows a top view of the system of FIG. 3A, but with the projector 137 arranged in the mobile device to provide the projected image orientation of the system shown in FIG. 1B so that the mobile device body 131 is closest to a side of the substantially rectangular projected image (assuming no correction required) when the surface 103 is viewed from the top. In FIG. 4B, the boundary of the desired projected image without distortion is shown by dotted line 413. As a result of the distortion, the projected image 415, however, is not rectangular, as shown. Line 417 indicates the fast scan direction for a laser scan. Note that the distorted image 415 is shown with the distortion exaggerated, and may not show the distortion accurately.

The distortion caused by the non-perpendicularity of the center beam line to the surface 103 is called keystone distortion. An aspect of the present invention is correcting the keystone distortion. Such correction is called keystone correction herein.

One embodiment of keystone correction is carried out by instructions instructing the processing system 105 (or 135) to carry out keystone correction. The correction method includes identifying a rectangular area in the area covered by the distorted image. The scan lines are adjusted in the fast scan direction to vary according to the position in the slow scan direction such that each scan line is equal. In one embodiment, in each scan line in the fast scan direction, the method sets all pixels outside this defined rectangle to black. The remaining pixels are adjusted in width to suit the remaining scan line length, and used to image in the active part of the scan line.

Note that the image to be projected needs to be mapped to the set of pixels that are used to display it. Because some of the available pixels have been distorted, the resolution of the display has dropped in some regions, so, for example, more than one pixel in the image may map to the same pixel in the projector. In an improved embodiment, in such a case, the pixel to be projected is determined as a combination of those pixels that would otherwise map to the same pixel. In one embodiment, the combination is a linear combination of the pixels that would otherwise map to the same projected pixel, the weighting in proportion to the amount of overlap.

Other methods of correcting for keystone distortion are known in the art, and such other methods can be incorporated in the invention, as would be clear to those in the art. See for example, Rahul Sukthankar, Robert Tockton, and Mathiew Mullin, "Automatic Keystone Correction for Camera-assisted Presentation Interfaces," in *Advances in Multimodal Interfaces-Proceedings of ICMI* 2000 ("Sukthankar et al.") for a method that uses a camera, but which is easily modifiable by those in the art because many of the measurements obtained by the camera a easily calculated from the known geometry in the case of the present invention. The following two provisional patent applications and two ordinary patent applications describe material covered by the Sukthankar et al method and are all incorporated herein by reference: U.S. Provisional Patent Application 60/172,037 and U.S. patent application Ser. No. 09/712,747, titled "CALIBRATION METHOD FOR PROJECTOR-CAMERA SYSTEM," filed 1999 and 2000, respectively, and U.S. Provisional Patent Application 60/172,051 and U.S. patent application Ser. No. 09/712,599 titled "AUTOMATIC KEYSTONE CORRECTION," filed 1999 and 2000, respectively.

Thus, the aspect of the invention of including keystone correction is not restricted to any particular method of carrying out the correction.

Figure 5A:
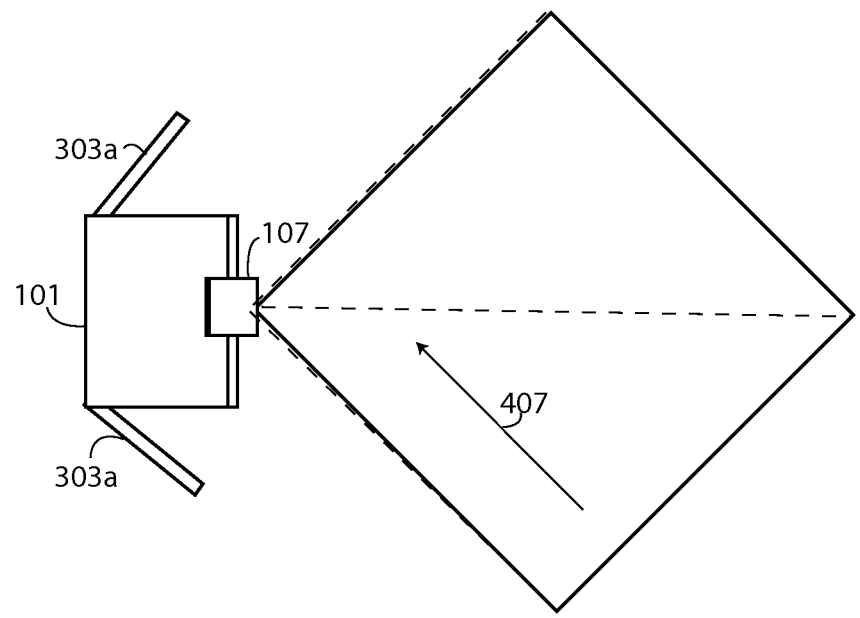
FIGS. 5A and 5B show how with correction, the images formed are substantially corrected in the respective cases of the projected image being at the first orientation (as in FIG. 1A) and the other orientation (FIG. 1B), respectively.
Figure 5B:
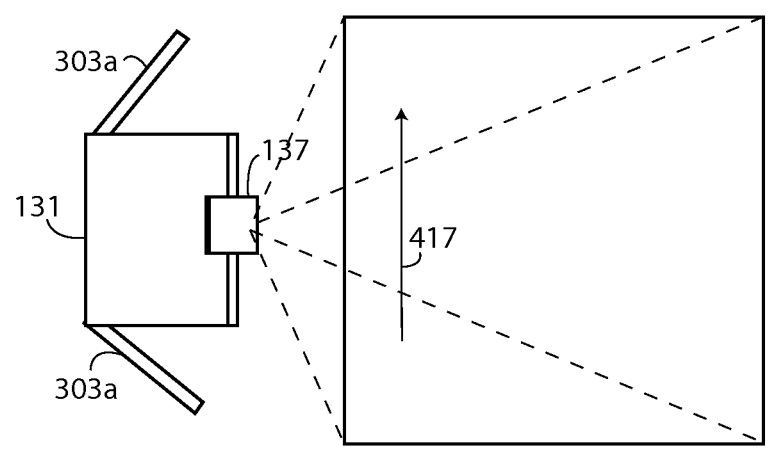

FIGS. 5A and 5B show top views of the images produced by the systems of FIGS. 4A and 4B, respectively, when keystone correction is included.

While the embodiments described herein have a pen-location transcription system that uses a writing implement that includes transmitters, and a sensor array coupled to the body of the mobile device, alternatively, the pen-location transcription system may include a writing implement that receives signals which are transmitted from one or more transmitters, that are, for example, mechanically coupled to the body of the mobile device. In such instances, the pen-location transcription system determines a position of the writing implement relative to the active area surface based on the signals sent from the transmitters to the writing implement.

In the cases where signals are transmitted between the writing implement and one or more receivers or transmitters, the signals may be electromagnetic signals (e.g., light including infrared, laser, electrical, radar), acoustic signals (e.g., ultrasound), resonant signals, or any combination thereof or any other form of signal which would enable a system to determine a position of a writing implement relative to the active area, and in particular, the projected image.

One embodiment of the pen-location transcription system is described in U.S. Pat. No. 6,335,723 to Wood, et al. issued Jan. 1, 2002, titled "TRANSMITTER PEN LOCATION SYSTEM," incorporated herein by reference. In the pen-location transcription system based on in U.S. Pat. No. 6,335,723, the writing implement with a pointing tip has multiple output elements, and is used to accurately determine the location of the pointing tip, in relation to the active area of the surface 103. The first output element, preferably an infrared transducer, transmits a first output signal from the writing implement. The second output element, preferably an ultrasonic transducer, transmits a second output signal, having a lower propagation velocity than the first output signal, from the writing implement to two or more sensors. In a basic embodiment, the first output signal arrives at one or more sensors generally concurrently. The second output signal, having a speed of propagation different from the speed of propagation of the first signal, is transmitted from the writing implement at a known time in relation to the first output signal, and arrives at each of the sensors at a time which is dependent on the velocity of the second signal and the distance between the writing implement and the sensors. The location of the pointing tip of the writing implement is then determined by the sensor signal processor 607, by using the first signal as a boundary condition, by comparing the waveform of the second output signal to one or more stored prior second output signals to determine an accurate time of arrival, and by solving simultaneous equations. Alternative embodiments allow the transmission of supplementary information from the writing implement to the sensors, using either the first and/or second output signals, such as determined pen color, line color, width, and pen user identification.

An improved embodiment of the pen-location transcription system is described in U.S. Pat. No. 6,414,673, also to Wood, et al. issued Jul. 2, 2002 and titled "Transmitter pen location system." U.S. Pat. No. 6,414,673 is incorporated herein by reference. The pen-location transcription system based on U.S. Pat. No. 6,414,673 uses a writing implement that is adapted to send a repeated output signal to external sensors at two or more sensor locations. The location of the pointing tip of the writing implement is determined in relation to the writing surface of a whiteboard. In one embodiment an output element, preferably an ultrasonic transducer, transmits a time dependent output signal from a single signal transmitter writing implement to two or more external sensors at two or more sensor locations. The direction of arrival of the output signal to each of the sensor locations is determined, and the pointing tip of the single transmitter writing implement is then determined, as the intersection of direction vectors from the writing implement to the external sensors. In another embodiment, the transducer transmits a time dependent output signal from the transmitter writing implement to three or more sensors in the sensor array, wherein the received signal is processed to determine the time of arrival to each of the sensors, and the location of the pointing tip of the writing implement is determined as the calculated distance between the sensors. In another alternate embodiment having a dual signal transmitter writing implement, a third sensor located at a sensor location is used to determine the time of arrival of a secondary output signal, to determine the distance between the dual signal transmitter writing implement and the sensor location, while two or more sensors at the sensor location are used to determine the direction of arrival of the primary time dependent output signal. Alternative embodiments allow the transmission of supplementary information from the transmitter writing implement to the sensors, using waveshaping of the output signal.

The above patents also describe or refer to methods for calibrating the sensor array. By having the sensors of the sensor array be at known locations relative to each other and relative to the active area, one aspect of the invention includes automatic calibration.

Other embodiments of the pen-location transcription system also may be used. One such alternate embodiment of adding a transcription system that includes a sensor array detecting signals from a writing implement that includes a transmitter is described in U.S. Pat. Nos. 6,266,051 and 6,456,280 to Holtzman titled "RETROFITTABLE APPARATUS FOR CONVERTING A SUBSTANTIALLY PLANAR SURFACE INTO AN ELECTRONIC DATA CAPTURE DEVICE" U.S. Pat. Nos. 6,266,051 and 6,456,280 are incorporated herein by reference. Furthermore, one alternate implementation of the transmitter device 119 in the writing implement 113 is disclosed in U.S. Pat. No. 5,866,856 (issued Feb. 2, 1999) and U.S. Pat. No. 6,373,003 (issued Apr. 16, 2002) to inventor Holtzman TITLED "MARKING DEVICE FOR ELECTRONIC PRESENTATION BOARD." U.S. Pat. Nos. 5,866,856 and 6,373,003 are incorporated herein by reference. The transmitter U.S. Pat. Nos. 5,866,856 and 6,373,003 disclose is for use with a conventional pen in which the ultrasound transmitter is a cylindrical element lying coaxial with the pen and adjacent to its tip, and a jointed eraser structure. The sensor signal processor 607 uses conventional triangulation techniques to track the position and motion of the writing implement (as a writer or as an eraser). An encoding facility associated with the writing implement provides the ability to distinguish whether the writing implement is used for marking or an as an eraser, as well as determining the nature or character of written line width or eraser swath. A data stream thus is generated after detection by the sensor array and can be used in a variety of ways, such as, for example, to feed information into the memory 605 coupled to the processor(s) of the processing system 105 of the mobile device.

Other pen-location transcription systems also are known that use various techniques to determine the position of a writing implement or stylus on a flat surface that can be adapted to be used in alternate embodiments of the invention. Examples of systems that use airborne ultrasound systems are described in U.S. Pat. No. 4,777,329 to Mallicoat, U.S. Pat. No. 4,814,552 to Stefik et al., U.S. Pat. No. 4,506,354 to Hansen and U.S. Pat. No. 1,758,691 to De Bruyne. These systems employ various combinations of ultrasound transmitters and sensors arranged at two points fixed relative to a board and on a movable writing implement. The position of the movable writing implement is then derived by triangulation. These systems typically require an additional hard-wired or electromagnetic link between the movable writing implement and a base unit, e.g., in the mobile device to provide timing information for time-of-flight ultrasound calculations. An additional switch is also required to identify when the movable element is in contact with the board.

In more detail, M. Stefik and C Heater, Ultrasound Position Input Device, U.S. Pat. No. 4,814,552 (Mar. 21, 1989) discloses an "input device, or stylus, for entering hand drawn forms into a computer using a writing instrument, a pressure switch for determining whether the instrument is in contact with the writing surface, an acoustic transmitter for triangulating the position of the stylus on the surface, and a wireless transmitter for transmitting data and timing information to the computer. In operation, the stylus transmits an infrared signal which the system receives immediately, and an ultrasound pulse which two microphones receive after a delay which is a function of the speed of sound and the distance of the stylus from the microphone". Stefik et al. discloses an algorithm to analyze the incoming ultrasound signals to locate the stylus. The algorithm computes radii to each of the two microphones using information from only a single sonic pulse sample, translates the two radii into a calculated X,Y location, and then filters the calculated X,Y values, removing them from the described path if they vary from a specified limit, or range.

B. Edwards, Ultrasound Position Locating Method and Apparatus Therefore, U.S. Pat. No. 5,142,506 (Aug. 25, 1992) discloses a "positional locating method and apparatus for measuring distances by accurately determining the transit time of ultrasonic wave bursts between two or more points". "Timer clocks are started when each of the bursts is triggered to be emitted from a transmission point, and are stopped when a highly defined point in the burst is received at a corresponding receiving point. The highly defined point is determined by first analyzing the burst to identify a particular cycle within the burst. The particular cycle is then analyzed to detect the specific point within the cycle".

Edwards typically uses multiple receivers to locate a transmitter using ordinary trigonometric calculations. It is an analog system uses comparison of amplitude between a small number of measured peaks on successive cycles within "bursts" of the received ultrasonic waveform. There may be disadvantages because of common variations of the waveform that occur, typically due to ordinary use of a transmitter, either from the orientation of the transmitter to the receivers, the speed at which the transmitter is moved between different regions of a writing surface, the signal strength of the transmitted signal, or noise, can result in erroneous results. The inventors found that reliance on the amplitude of a specific cycle within a pulse waveform can lead to errors of one or more cycles, resulting in position detection errors of several centimeters. Errors in such an analog system commonly result either in an inaccurate determined location for the transmitter, or in a determined location point which is required to be "thrown out" from the described path of the movable transmitter. As well, the analog system used inherently limits the type of comparison between the amplitude of selected cycle peaks within signal "bursts" within a prior output signal and a current output signal, thus preventing the analog system to being easily adaptable to hardware embodiments or improved waveform comparison techniques.

For this reason, the inventors prefer a digital system as described above for determining the position of the transmitter 119 in the writing implement 113.

Another digital system for recognizing ink is described in U.S. Patent Application 2003/0071798 to Baron et al., published Apr. 17, 2003, and titled "SYSTEM AND METHOD FOR TRANSMITTING, RECEIVING, AND GENERATING DIGITAL INK FROM TRIANGULATION DATA OF A TRANSPONDER-STYLUS" (the "Baron et al." system). The Baron et al. system is for generating digital ink from triangulation data of a stylus comprises an electromagnetic radiation source capable to emit electromagnetic pulses; a first and a second ultrasound detector separated from each other by a known distance; a timer coupled to the radiation source, the first detector, and the second detector, and capable to measure a first elapsed time between emission of an electromagnetic pulse from the radiation source and detection of an ultrasound wave at the first detector, and further capable to measure a second elapsed time between emission of the electromagnetic pulse from the radiation source and detection of an ultrasound wave at the second detector; and a triangulation engine coupled to the timer and the radiation source, the engine capable to instruct the source to emit a plurality of radiation pulses, to triangulate the position of an ultrasound transponder over time based on the first elapsed time, the second elapsed time and the known distance between detectors, and to generate characters based on the triangulation data. A commercial implementation of the Baron et al. system is the E-pen™ system available from InMotion E-Pen Ltd, Matam, Haifa, Israel. See, for example, www~dot~e-pen~dot~com, where ~dot~ denotes the period character "." in the actual URL. U.S. Patent Application 2003/0071798 is incorporated herein by reference. How to incorporate the Baron et al. system, e.g., as the sensor array, would be straightforward to one in the art from the information provided herein and in the incorporated-by-reference patent application.

Another aspect of the invention is inclusion in the writing implement of a switch and of a control mechanism such as a button to invoke the switch, and for the pen-location transcription system to be able to detect when the switch has been invoked, so that the writing implement can act as a pointing and control device in relation to the projected image, much in that manner that a mouse provides pointing and control. One version of the writing implement includes a push down switch shown as switch 123 in FIG. 1A such that pressing the writing implement against the surface provides a "click" for the control function. Other versions include multiple switches and controls.

Figure 7:
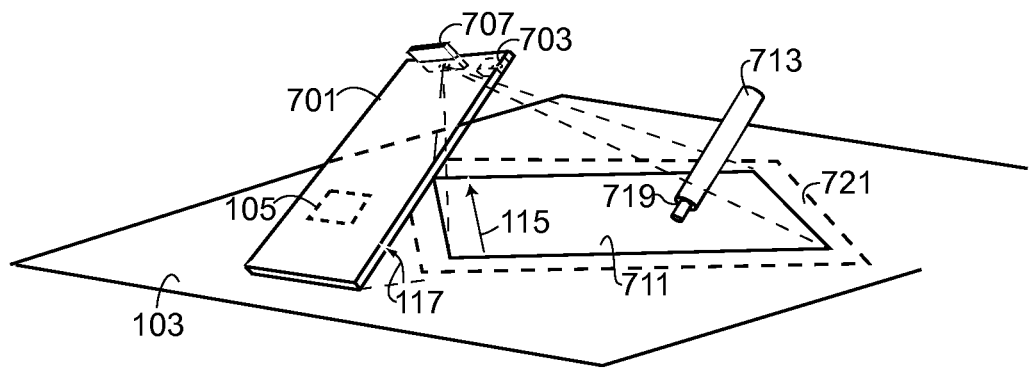
FIG. 7 shows in simplified form one embodiment of a mobile device that includes a projector and a video-camera based location transcription system.

Other embodiments of the invention have a projector displaying an image from a processing system and additionally use one or more video devices to record the positions of the writing implement on the active area. One such embodiment is shown in FIG. 7 that shows a mobile device that includes a projector 707 and a pen-location transcription system, with the projector projecting an image at the first orientation of FIG. 1A relative to the orientation of the mobile device. The mobile device includes a body 701 and a processing system 105 that provides a mobile processing function. The projector is coupled to the processing system 105 and projects an image 711 from the processing system. The projected image 711 is substantially rectangular. The projector 707 is mechanically coupled to the body 701 and arranged to project the image 711 into a substantially planar surface 103 when the mobile device body 701 is on the surface 103 at a predetermined angle 117 relative to the surface 103. The projector 707 and the angle are such that when the mobile device is at the predetermined angle, the projected image is in focus and substantially rectangular.

The one or more video sensors are coupled to the body 101 and are used to detect the positions of a writing implement 713, and in particular, the movements of the tip, shown as 719, of the writing implement 713. The FIG. 7 embodiment shows one video camera 703. The video camera covers an active area 721 on the surface. The active area includes the projected image 711.

Figure 8:
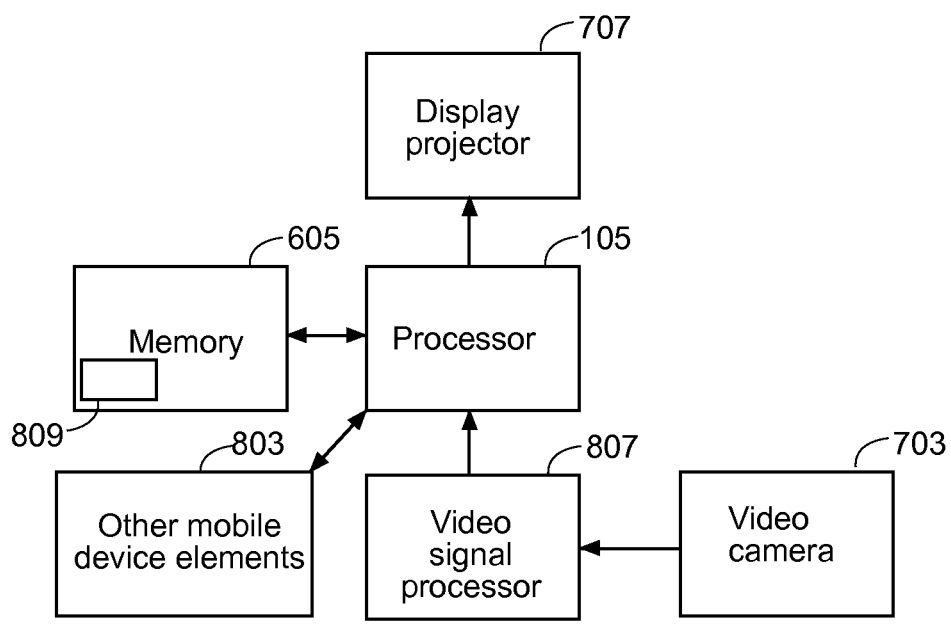
FIG. 8 shows a block diagram of the embodiment shown in FIG. 7.

FIG. 8 shows a block diagram of the embodiment shown in FIG. 7. The processing system 105 includes one or more processors coupled to a memory 805 that includes a portion 809 storing code segments to implement the processing steps required to determine the pen strokes of the writing implement. The video camera 703 is coupled to the processing system 105 via a video signal processor 807 that processes the video from the video camera. In one embodiment, the video processor includes a video frame grabber that causes video frames of the active area 721 at different instants of time to be stored in the memory 805. Recall that for simplicity, the memory 805 is shown as a single memory than in an actual implementation may be several memories, one of which may be a video memory. In one embodiment, the mobile device also includes one or more additional elements coupled to the processing system to provide various functions of the mobile device, e.g., telephony, and such additional elements are collectively shown as other mobile device elements 803.

One implementation includes a distinguishing mark on the tip 719 of the writing implement that can be identified on video frames. One embodiment includes a mark that is relatively easy to identify in the video frames. Different distinguishing marks can be used to identify the tips of writing implements of different color and/or marking thickness and/or and erasing device.

How to track to movements of a pen tip is known in the art. For example, the paper by M. Wienecke, G. A. Fink, and G. Sagerer titled "Towards automatic video-based whiteboard reading." In Proc. Int. Conf. on Document Analysis and Recognition, pages 87-91, Edinburgh, Scotland, 2003. IEEE ("Wienecke et al."), describes a prototype system for automatic video-based whiteboard reading. The system is designed for recognizing unconstrained handwritten text and is further characterized by an incremental processing strategy in order to facilitate recognizing portions of text as soon as they have been written on the board. The paper presents methods employed for extracting text regions, pre-processing, feature extraction, and statistical modeling and recognition. Evaluation results on a writer independent unconstrained handwriting recognition task demonstrate the feasibility of the Wienecke et al. approach.

A visual input system suitable for pen computers is described in M. E. Munich and P. Perona, "Visual Input for Pen-Based Computers", Proceedings of the 13th International Conference on Pattern Recognition, Vienna, August 1996. Pen trajectories are automatically extracted from image sequences recorded during the writing process.

The paper by G. A. Fink, M. Wienecke, and G. Sagerer titled "Video-based on-line handwriting recognition," Proc. International Conference on Document Analysis and Recognition, pages 226-230. IEEE, 2001 ("Fink et al") describes a complete video-based on-line handwriting recognition system based on the Munich and P. Perona work. Described in Fink et al. are the techniques applied for pen tracking, pre-processing, feature extraction, and statistical modeling and recognition. Evaluation results on a writer-independent unconstrained handwriting recognition task demonstrate that the inherent limitations of the video-based approach can be compensated using robust modeling combined with adaptation techniques. Similar work is described in M. Wienecke, G. A. Fink, and G. Sagerer: "A handwriting recognition system based on visual input." In 2nd International Workshop on Computer Vision Systems, pages 63-72, Vancouver, Canada, 2001. IEEE.

Oguz Özün, Ö. Faruk Özer, C. Öncel Tützel, Volkan Atalay, A. Enis çetin in "Vision based single stroke character recognition for wearable computing," IEEE Intelligent Systems and Applications in June 2001, propose using video-based techniques for stroke recognition, and then to use the stroke recognition for recognizing characters, e.g., written in the graffiti language or otherwise.

Thus, there are various methods of recognizing pen strokes available.

Embodiments of methods described herein are in the form of a computer program that executes on a processing system, e.g., a one or more processors that are in a processing system that is part of a mobile device. Thus, as will be appreciated by those skilled in the art, embodiments of the present invention may be embodied as a method, an apparatus such as a special purpose apparatus, an apparatus such as a data processing system, or a non-transitory computer-readable medium, e.g., a computer program product that includes instructions that when executed by at least one processor of a processing system, cause carrying out a method. Accordingly, aspects of the present invention may take the form of a method, an entirely hardware embodiment, an entirely software embodiment or an embodiment combining software and hardware aspects. Furthermore, the present invention may take the form of non-transitory computer-readable medium (e.g., a computer program product on a computer-readable storage medium) having computer-readable program code segments therein. Any suitable non-transitory computer-readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Embodiments are described that in addition to the pen-location transcription system that uses energy between a writing implement and a sensor array, include a projector that is coupled to the processing system of the mobile device and that projects an image from the processing system.

Furthermore, embodiments of the invention are described that have the projector projecting from what might be called to "top" of the body of the mobile device. Other embodiments have the projector located at other locations of the mobile device body.

Figure 9:
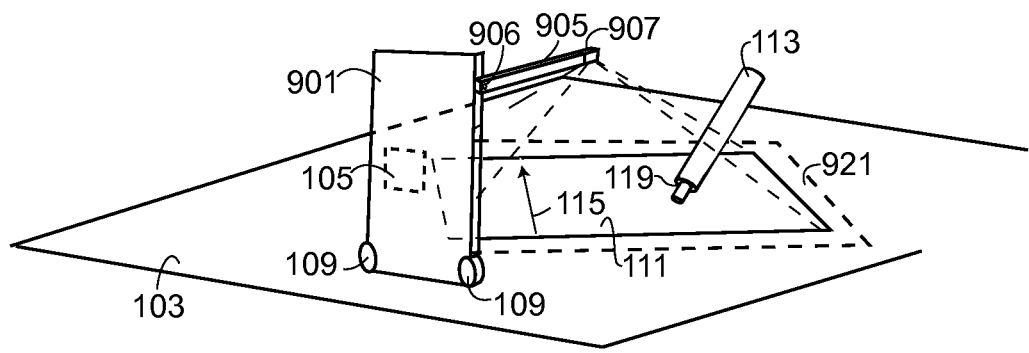
FIG. 9 shows in simplified form another embodiment of a mobile device that includes a projector, with the video projector in an arm that is attached using a hinge to the mobile device body.

In one such embodiment shown in FIG. 9, the projector 907 is included an arm 905 hingeably connected to the mobile device body 901, e.g., connected using a hinge 906 on a side of the mobile device body. The hinge 906 is such that the arm 905 that includes the projector 907 may be locked in a position for projecting. The arm is shown so locked in FIG. 9. In one version, once so locked, the projector projects onto the surface with the center beam perpendicular to the surface such that no keystone correction is required. One such version provides the projector arm to be on different sides to allow for a left-handed or right handed user to use the device without the projector and projector arm being in the way.

Figure 10A:
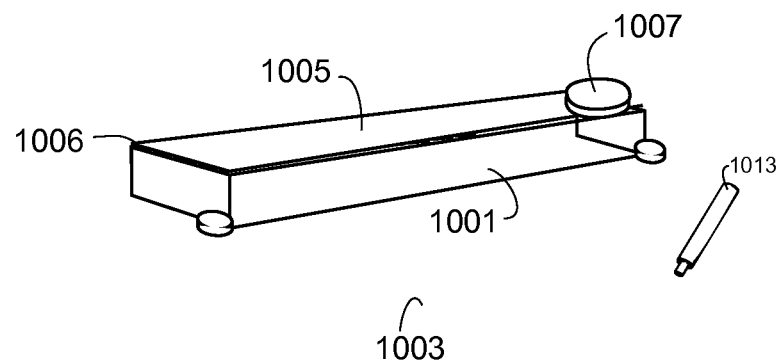
FIGS. 10A and 10B show, in simplified form, an alternate embodiment of attaching a projector to a mobile device. A foldable arm that contains the video projector used to display an image to be used with a pen-location transcription system that is included with the mobile device.
Figure 10B:
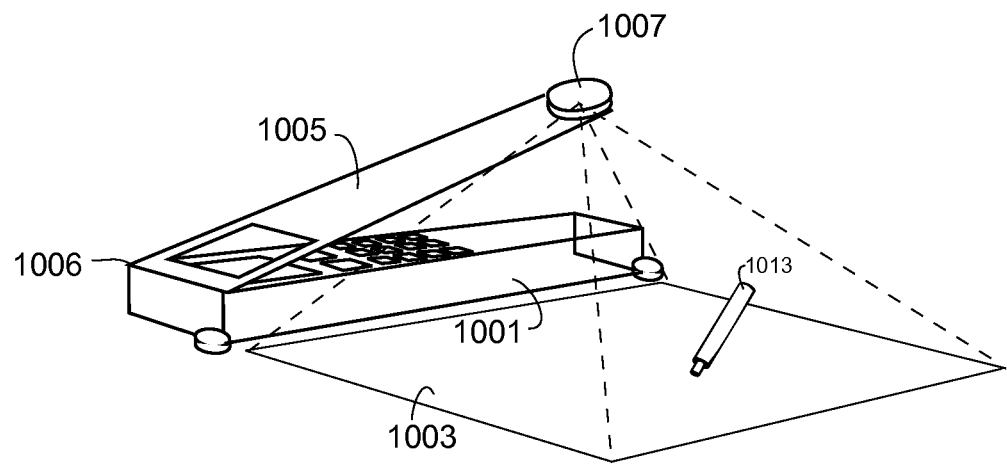

Other arrangements for the projector also are possible. FIGS. 10A and 10B show one alternate mechanism for mounting the projector. The mobile device body 1001 rests substantially parallel to the substantially planar surface 1003. The body 1001 is connected to an arm 1005 using a hinge 1006 on a side of the mobile device body 1001. The arm 1005 includes near one end a projector 1007 that is used for projecting an image into the surface 1003. FIG. 10A shows the device with the hingeably connected arm in a closed position, e.g., for when the mobile device is not in use. FIG. 10B shows the device with the hingeably connected arm raised in a locked position configured to project an image on the surface 1003 adjacent to the device. The device can then be used with a writing implement or pointing device 1013 and the pen-location transcription system in the mobile device. Note that the same hingeably connected arm can be used to hide a keypad, e.g., for the case the mobile device is a mobile telephone.

While the embodiments described above use a projector to project an image for display and with which a user can operate a pointing device using an incorporated pen transcription system, alternate embodiments use alternate technologies for displaying the image on a substantially flat surface. There exist alternate methods and devices known in the art to display such an image. Recently, foldable displays have become available. Philips Research, Eindhoven Netherlands recently announced foldable, rollable displays it calls "e-paper". See for example the article accredited to Reuters on Sep. 24, 2003 titled "New E-paper could show moving images too," published, for example, at Forbes.com. electronics. A new company, called Polymer Vision, Eindhoven, Netherlands, www.polymervision.nl, has been created to market the rollable display material. The foldable display is incorporated into the mobile device body and is normally in a rolled position. The rollable display is rolled out flat to provide a display on which a user may point using a pointing device and a pen-location transcription system in the mobile device. See also U.S. Pat. No. 6,661,563, to Hayashi et al. issued Dec. 9, 2003 and titled "SHEET-SHAPED DISPLAY, SPHERE-LIKE RESIN BODY, AND MICRO-CAPSULE."

Figure 11A:
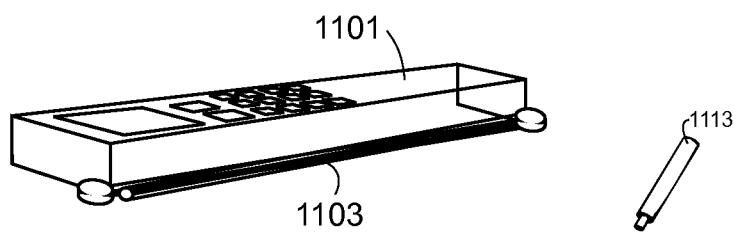
FIGS. 11A and 11B show, in simplified form, an alternate embodiment of a mobile device. The device includes a foldable display, e.g., a foldable LCD display to display an image to be used with a pen-location transcription system that is included with the mobile device.
Figure 11B:
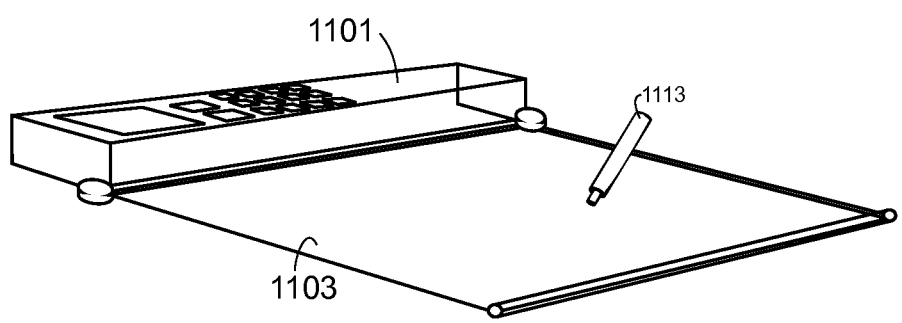

FIGS. 11A and 11B show, in simplified form, an embodiment of a mobile device that includes a foldable display unit, to display an image to be used with a pen-location transcription system. FIG. 11A shows a mobile device 1101 with a foldable display 1103 in a folded rolled-up configuration, e.g., in a configuration suitable for mobile transportation. FIG. 10B shows the foldable LCD display 1103 in an unfolded configuration, e.g., suitable for writing with a writing implement 1113 for use in a pen-location transcription system. The foldable display 1103 functions as a replacement for the projector unit used in other embodiments, e.g., those embodiments shown FIGS. 1A and 1B. Modifications and combinations described in projector embodiments can be incorporated into foldable display embodiments.

Those in the art will understand that in an actual implementation, the processing system 105 may contain a single processor, or several processors, including one or more general purpose processors, and one or more special purpose processors, such as DSP devices. Thus, for example, in the case that the processing system includes more than one processor, by stating that the sensor array is coupled to the processing system, this may be to one processor, while another device coupled a different processor of the processing system. Similarly, in the embodiment that includes a video camera, in the case that there are several processors in the processing system, the processor that analyzes the video to determine stroke data may not be the same processor as that providing the mobile device function. Similarly, some or all of the video signal processor may be part of the processing system 105.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A mobile device providing a mobile processing function, the mobile device comprising:
   a mobile device body;
   a processing system within the body including at least one processor programmed to be part of providing the mobile processing function;
   a projector mechanically coupled to the body to project an image from the processor onto a substantially planar surface when the mobile device body is on the surface such that the projector projects at a predetermined angle relative to the surface; and
   a pen-location transcription system coupled to the processing system to determine the positions of a writing implement or stylus at a plurality of instants of time by transmitting energy, including acoustic energy, between the writing implement or stylus and a device mechanically coupled to the mobile device body, the pen-location transcription system including one or more transmitters of acoustic energy and one or more acoustic sensor, the position determining including detecting an indication of time-of-arrival of said transmitted acoustic energy at said at least one acoustic sensor relative to the time or times of transmitting by at least one of the one or more transmitters of acoustic energy,
   wherein the mobile device further includes a support mechanism to maintain the mobile device such that the projector projects at the predetermined angle relative to the surface,
   wherein the support mechanism includes a pair of arms that are each hingeably connected to the mobile device body, able to be folded in and out, and that when folded out, lock to maintain the mobile device at the predetermined angle relative to the surface,
   wherein the writing implement or stylus includes a transmitter of the acoustic energy,
   wherein the support arms include at least two acoustic sensors to detect the transmitted acoustic energy, and
   wherein the support mechanism includes a mechanism establishing the relationship between said at least two acoustic sensors such that when the arms lock to maintain the mobile device body such that the projector projects at the predetermined angle relative to the surface, the relationship between said at least two sensors is established.

2. A mobile device as recited in claim 1, wherein the device mechanically coupled to the mobile device body comprises a set of sensors including at least two acoustic sensors of the transmitted acoustic energy and wherein the writing implement or stylus includes said at least one transmitter of the acoustic energy.

3. A mobile device as recited in claim 1, wherein the transmitted energy includes electromagnetic energy.

4. A mobile device as recited in claim 1, wherein the projector is a laser projection display that includes a laser subsystem operative to generate a laser beam and to scan the laser beam along two directions to form the image on the surface.

5. A mobile device as recited in claim 1, wherein the image being projected has a rectangular boundary, and wherein the processing system includes at least one processor programmed to correct for the distortion that would occur because the distances from the projector to the corners of the rectangular boundary are not the same for all corners, such that the projected image has a substantially rectangular boundary on the surface.

6. A mobile device as recited in claim 1, wherein the image being projected has a rectangular boundary and wherein the projector is arranged in the mobile device such that the substantially rectangular projected image has parallel sides that are substantially parallel to the mobile device so that the mobile device is closest to a side of the substantially rectangular projected image when the surface is viewed from the top.

* * * * *